US012807227B2

(12) United States Patent
Smolyanskiy et al.

(10) Patent No.: US 12,807,227 B2
(45) Date of Patent: Nov. 24, 2026

(54) PERFORMING AUTONOMOUS PATH NAVIGATION USING DEEP NEURAL NETWORKS

(71) Applicant: NVIDIA Corporation, Santa Clara, CA (US)

(72) Inventors: Nikolai Smolyanskiy, Seattle, WA (US); Alexey Kamenev, Carlsbad, CA (US); Jeffrey David Smith, Duvall, WA (US); Stanley Thomas Birchfield, Sammamish, WA (US)

(73) Assignee: NVIDIA Corporation, Santa Clara, CA (US)

( * ) Notice: Subject to any disclaimer, the term of this patent is extended or adjusted under 35 U.S.C. 154(b) by 61 days.

(21) Appl. No.: 17/692,706

(22) Filed: Mar. 11, 2022

(65) Prior Publication Data

US 2022/0197284 A1 Jun. 23, 2022

Related U.S. Application Data

(63) Continuation of application No. 16/921,796, filed on Jul. 6, 2020, now Pat. No. 11,281,221, which is a (Continued)

(51) Int. Cl.
*B62D 15/02* (2006.01)
*B62D 6/00* (2006.01)
(Continued)

(52) U.S. Cl.
CPC ........... *B62D 15/025* (2013.01); *B62D 6/001* (2013.01); *G05D 1/0088* (2013.01);
(Continued)

(58) Field of Classification Search
CPC .............................. B62D 15/025; G06V 10/82
See application file for complete search history.

(56) References Cited

U.S. PATENT DOCUMENTS 4,700,307 A 10/1987 Mons et al.
5,079,706 A 1/1992 Yamaguchi et al.
(Continued)

FOREIGN PATENT DOCUMENTS

CN 101033978 A 9/2007
CN 105892471 A 8/2016
(Continued)

OTHER PUBLICATIONS

Chinese Decision of Rejection for Application No. 201810301071.3, mailed Aug. 12, 2022, 15 pages.
(Continued)

*Primary Examiner* — Wade Miles
*Assistant Examiner* — Zachary Joseph Wallace
(74) *Attorney, Agent, or Firm* — Davis Wright Tremaine LLP

(57) ABSTRACT

A method, computer readable medium, and system are disclosed for performing autonomous path navigation using deep neural networks. The method includes the steps of receiving image data at a deep neural network (DNN), determining, by the DNN, both an orientation of a vehicle with respect to a path and a lateral position of the vehicle with respect to the path, utilizing the image data, and controlling a location of the vehicle, utilizing the orientation of the vehicle with respect to the path and the lateral position of the vehicle with respect to the path.

20 Claims, 10 Drawing Sheets

Related U.S. Application Data continuation of application No. 15/939,116, filed on Mar. 28, 2018, now Pat. No. 10,705,525.

(60) Provisional application No. 62/483,155, filed on Apr. 7, 2017.

(51) Int. Cl.

| | |
|---|---|
| ***G05D 1/00*** | (2024.01) |
| ***G06F 18/2413*** | (2023.01) |
| ***G06N 3/04*** | (2023.01) |
| ***G06N 3/08*** | (2023.01) |
| ***G06N 3/084*** | (2023.01) |
| ***G06N 7/01*** | (2023.01) |
| ***G06V 10/764*** | (2022.01) |
| ***G06V 10/82*** | (2022.01) |
| ***G06V 10/94*** | (2022.01) |
| ***G06V 20/56*** | (2022.01) |
| *G06V 20/58* | (2022.01) |

(52) U.S. Cl.

CPC ........... *G05D 1/0221* (2013.01); *G05D 1/024* (2013.01); *G05D 1/0242* (2013.01); *G05D 1/0246* (2013.01); *G05D 1/0255* (2013.01); *G05D 1/0257* (2013.01); *G05D 1/0268* (2013.01); *G05D 1/102* (2013.01); *G06F 18/2414* (2023.01); *G06N 3/04* (2013.01); *G06N 3/08* (2013.01); *G06N 3/084* (2013.01); *G06N 7/01* (2023.01); *G06V 10/764* (2022.01); *G06V 10/82* (2022.01); *G06V 10/955* (2022.01); *G06V 20/56* (2022.01); *G06V 20/588* (2022.01); *G06V 20/58* (2022.01)

(56) References Cited

U.S. PATENT DOCUMENTS

| | | | | |
|---|---|---|---|---|
| 5,548,512 | A | 8/1996 | Quraishi | |
| 6,018,696 | A | 1/2000 | Matsuoka et al. | |
| 6,351,711 | B1 | 2/2002 | Chansarkar | |
| 7,757,608 | B2 | 7/2010 | Kono et al. | |
| 9,081,385 | B1* | 7/2015 | Ferguson | G05D 1/0246 |
| 9,373,057 | B1* | 6/2016 | Erhan | G06N 3/0464 |
| 9,710,710 | B2 | 7/2017 | Malecki et al. | |
| 9,731,755 | B1 | 8/2017 | Moshchuk et al. | |
| 9,751,529 | B2 | 9/2017 | Zhang et al. | |
| 9,760,806 | B1* | 9/2017 | Ning | G06T 7/277 |
| 9,958,873 | B2 | 5/2018 | Thomson | |
| 10,207,820 | B2 | 2/2019 | Sullivan et al. | |
| 10,409,280 | B2 | 9/2019 | Zhu | |
| 10,528,824 | B2 | 1/2020 | Zou | |
| 10,730,531 | B1* | 8/2020 | Phillips | G06N 20/00 |
| 2007/0021915 | A1* | 1/2007 | Breed | G08G 1/161<br>701/301 |
| 2010/0097455 | A1* | 4/2010 | Zhang | G06V 20/588<br>701/25 |
| 2010/0104137 | A1* | 4/2010 | Zhang | G06V 20/588<br>382/104 |
| 2010/0191391 | A1* | 7/2010 | Zeng | G01S 13/87<br>701/1 |
| 2010/0209885 | A1 | 8/2010 | Chin et al. | |
| 2012/0245709 | A1 | 9/2012 | Taira et al. | |
| 2012/0277898 | A1 | 11/2012 | Kawai et al. | |
| 2013/0266175 | A1* | 10/2013 | Zhang | G06V 10/457<br>382/103 |
| 2016/0085310 | A1* | 3/2016 | Shotton | G06F 18/24<br>382/103 |
| 2016/0184995 | A1 | 6/2016 | Uchiyama | |
| 2016/0191391 | A1* | 6/2016 | Wood | H04L 45/02<br>370/235 |
| 2016/0325753 | A1 | 11/2016 | Stein et al. | |
| 2017/0010107 | A1 | 1/2017 | Shashua et al. | |
| 2017/0010108 | A1 | 1/2017 | Shashua | |
| 2017/0010115 | A1 | 1/2017 | Stein et al. | |
| 2017/0089706 | A1 | 3/2017 | Ribeiro et al. | |
| 2017/0098124 | A1* | 4/2017 | Jonsson | G06F 18/22 |
| 2017/0123425 | A1* | 5/2017 | Zhao | B64C 39/024 |
| 2017/0131719 | A1* | 5/2017 | Micks | B60W 30/09 |
| 2017/0169313 | A1* | 6/2017 | Choi | G06V 10/82 |
| 2017/0200063 | A1* | 7/2017 | Nariyambut Murali | G06F 18/285 |
| 2017/0242442 | A1 | 8/2017 | Minster | |
| 2017/0277197 | A1 | 9/2017 | Liao et al. | |
| 2017/0314954 | A1* | 11/2017 | Golding | G01C 21/3644 |
| 2017/0361873 | A1 | 12/2017 | Yu et al. | |
| 2018/0024562 | A1* | 1/2018 | Bellaiche | G06T 7/73<br>701/26 |
| 2018/0107215 | A1 | 4/2018 | Djuric et al. | |
| 2018/0120843 | A1 | 5/2018 | Berntorp et al. | |
| 2018/0225527 | A1* | 8/2018 | He | G06F 18/21375 |
| 2018/0362158 | A1* | 12/2018 | Zhang | B64C 39/024 |
| 2019/0193734 | A1 | 6/2019 | Ekl et al. | |
| 2019/0295179 | A1* | 9/2019 | Shalev-Shwartz | B60W 30/09 |
| 2019/0369637 | A1* | 12/2019 | Shalev-Shwartz | G01C 21/3415 |
| 2019/0377354 | A1* | 12/2019 | Shalev-Shwartz | B60W 30/0956 |
| 2020/0013189 | A1* | 1/2020 | Karanam | G06T 7/529 |
| 2020/0020117 | A1 | 1/2020 | Daehler et al. | |
| 2020/0257301 | A1* | 8/2020 | Weiser | G01C 21/3407 |

FOREIGN PATENT DOCUMENTS

| | | | |
|---|---|---|---|
| CN | 106347359 | A | 1/2017 |
| CN | 107139917 | A | 9/2017 |
| CN | 107390682 | A | 11/2017 |
| CN | 107436603 | A | 12/2017 |
| CN | 107609633 | A | 1/2018 |
| JP | H04252308 | A | 9/1992 |
| WO | 2007012199 | A2 | 2/2007 |
| WO | 2009022947 | A1 | 2/2009 |

OTHER PUBLICATIONS

Office Action for German Application No. 102018108314.9, mailed Jul. 21, 2023, 6 pages.

Alvarez et al., "Collision avoidance for quadrotors with a monocular camera," Experimental Robotics, Springer, Cham, 2016, pp. 1-14.

Bachrach et al. "Estimation, planning, and mapping for autonomous flight using an RGB-D camera in GPS-denied environments," The International Journal of Robotics Research, vol. 31, No. 11, 2012, pp. 1-38.

Bhatti et al., "Playing Doom with SLAM-Augmented Deep Reinforcement Learning," Dec. 1, 2016, 9 pages.

Bojarski et al., "End to end learning for self-driving cars," arXiv preprint arXiv:1604.07316, 2016, pp. 1-9.

Bry et al., "State estimation for aggressive flight in GPS-denied environments using onboard sensing," In Proceedings of the IEEE International Conference on Robotics and Automation (ICRA 2012), 2012, pp. 1-9.

Burman, "Quadcopter Stabilization with Neural Network," The University of Texas at Austin, Master's Thesis Dec. 2016, retrieved Feb. 27, 2020, https://repositories.lib.utexas.edu/bitstream/handle/2152/45875/BURMAN-MASTERSREPORT-2016.pdf?sequence=1&isAllowed=y, 35 pages.

Byun et al., "Vehicle position estimation based on magnetic markers: Enhanced accuracy by compensation of time delays," Sensors, vol. 15, No. 11, 2015, pp. 1-33.

Chinese Office Action for Patent Application No. 201810301071.3, dated Jul. 27, 2021, 11 pages.

Clevert et al., "Fast and Accurate Deep Network Learning by Exponential Linear Units (ELUs)," International Conference on Learning Representations (ICLR), 2016, pp. 1-14.

Eigen et al., "Depth Map Prediction from a Single Image using a Multi-Scale Deep Network," In Advances in Neural Information Processing Systems (NIPS), 2014, pp. 2366-2374.

(56) References Cited

OTHER PUBLICATIONS

Engel et al., “Direct Sparse Odometry,” IEEE Transactions on Pattern Analysis and Machine Intelligence, vol. 40, No. 3, Mar. 2018, pp. 611-625.
Faessler et al., “Autonomous, Vision-based Flight and Live Dense 3D Mapping with a Quadrotor Micro Aerial Vehicle,” Journal of Field Robotics, vol. 33, No. 4, 2016, pp. 1-20.
Fernandez et al., “Autonomous Navigation and Obstacle Avoidance of a Micro-bus,” International Journal of Advanced Robotic Systems, vol. 10, No. 4, 2013, pp. 1-9.
Forster et al., “SVO: Fast semi-direct monocular visual odometry,” Robotics and Automation (ICRA), 2014 IEEE International Conference, 2014, pp. 1-8.
Fraundorfer et al., “Vision-based autonomous mapping and exploration using a quadrotor MAV,” Intelligent Robots and Systems (IROS), 2012 IEEE/RSJ International Conference, 2012, pp. 1-8.
Girshick, “Fast R-CNN,” In IEEE Conference on Computer Vision and Pattern Recognition, 2015, 9 pages.
Giusti et al., “A machine learning approach to visual perception of forest trails for mobile robots,” IEEE Robotics and Automation Letters, vol. 1, No. 2, 2016, pp. 1-7.
He et al., “Deep Residual Learning for Image Recognition,” Proceedings of the IEEE conference on computer vision and pattern recognition, 2016, pp. 770-778.
Honegger et al., “An Open Source and Open Hardware Embedded Metric Optical Flow CMOS Camera for Indoor and Outdoor Applications,” Robotics and Automation (ICRA), 2013 IEEE International Conference, 2013, pp. 1-6.
Iandola et al., “Squeezenet: AlexNet-Level Accuracy with 50x Fewer Parameters and <0.5mb Model Size,” arXiv, Nov. 4, 2016, 13 pages.
IEEE, “IEEE Standard 754-2008 (Revision of IEEE Standard 754-1985): IEEE Standard for Floating-Point Arithmetic,” Aug. 29, 2008, 70 pages.
Krizhevsky et al., “ImageNet Classification with Deep Convolutional Neural Networks,” In Advances in Neural Information Processing Systems, 2012, 9 pages.
Lillicrap et al., Continuous Control with Deep Reinforcement Learning, Feb. 29, 2016, 14 pages.
Liu et al., “Learning Depth from Single Monocular Images using Deep Convolutional Neural Fields,” IEEE Transactions on Pattern Analysis and Machine Intelligence, Feb. 26, 2015, 14 pages.
Liu et al., “SSD: Single shot multibox detector. European Conference on Computer Vision (ECCV),” 2016, pp. 1-17.
Mashadil et al., “A path-following driver/vehicle model with optimized lateral dynamic controller,” Latin American journal of solids and structures, vol. 11, No. 4, 2014, pp. 613-630.
Meier et al., “PIXHAWK: A System for Autonomous Flight using Onboard Computer Vision,” ICRA, May 2011, pp. 1-6.
Michels et al., “High Speed Obstacle Avoidance using Monocular Vision and Reinforcement Learning,” ICML, 2005, 8 pages.
Mnih et al., “Asynchronous Methods for Deep Reinforcement Learning,” Jun. 16, 2016, 19 pages.
Nützi et al., “Fusion of IMU and vision for absolute scale estimation in monocular SLAM,” Journal of intelligent & robotic systems, vol. 61, No. 1, 2011, pp. 287-299.
Pizzoli et al., “REMODE: Probabilistic, Monocular Dense Reconstruction in Real Time,” IEEE International Conference on Robotics and Automation, 2014, 9 pages.
Rasmussen et al., “A Trail-Following Robot Which Uses Appearance and Structural Cues,” In Field and Service Robotics, 2014, 15 pages.
Redmon et al., “YOLO9000: Better, faster, stronger,” arXiv preprint, arXiv:1612.08242, 2016, pp. 1-9.
Redmon et al., “You Only Look Once: Unified, Real-Time Object Detection,” arXiv:1506.02640v1, 2015, pp. 1-9.
Ross et al., “Learning Monocular Reactive UAV Control in Cluttered Natural Environments,” IEEE International Conference on Robotics and Automation, May 2013, 8 pages.
Sadeghi et al., “Cad2rl: Real single-image flight without a single real image,” arXiv preprint arXiv:1611.04201, 2016, pp. 1-11.
Samy et al., “Drone Path-Following in GPS-Denied Environments using Convolutional Networks,” May 5, 2019, retrieved Feb. 27, 2020, https://arxiv.org/ftp/arxiv/papers/1905/1905.01658.pdf, 7 pages.
Saxena et al., “Make3D: Learning 3-D Scene Structure from a Single Still Image,” IEEE Transactions on Pattern Analysis and Machine Intelligence, 2008, 16 pages.
Scaramuzza et al., “Vision-controlled micro flying robots: from system design to autonomous navigation and mapping in GPS-denied environments,” IEEE Robotics & Automation Magazine, vol. 21, No. 3, Sep. 2014, pp. 26-40.
Scherer et al., “Flying fast and low among obstacles: Methodology and experiments,” The International Journal of Robotics Research, vol. 27, No. 5, 2008, pp. 1-35.
Simonyan et al., Very Deep Convolutional Networks for Large-Scale Image Recognition, ICLR, Apr. 10, 2015, 14 pages.
Szegedy et al., “Rethinking the Inception Architecture for Computer Vision,” CVPR, 2016, 9 pages.
Ummenhofer et al., “DeMoN: Depth and Motion Network for Learning Monocular Stereo,” Dec. 7, 2016, 21 pages.
Wu et al., “Lane Departure Avoidance Control for Electric Vehicle Using Torque Allocation,” Mathematical Problems in Engineering, vol. 2018, Feb. 19, 2018, pp. 1-11.
Zhang et al., “Learning Deep Control Policies for Autonomous Aerial Vehicles with MPC-Guided Policy Search,” 2015, 8 pages.
Notice of Reexamination for Chinese Application No. 201810301071.3, mailed Sep. 30, 2025, 22 pages.
Notice of Reexamination for Chinese Application No. 201810301071.3, mailed Jul. 31, 2025, 16 pages.
Office Action for Chinese Application No. 202211513550.4, mailed Aug. 18, 2025, 45 pages.
Office Action for Chinese Application No. 202211513550.4, mailed Apr. 1, 2026, 49 pages.
Office Action for Chinese Application No. 202211513550.4, mailed Aug. 14, 2026, 51 pages.

* cited by examiner

PERFORMING AUTONOMOUS PATH NAVIGATION USING DEEP NEURAL NETWORKS

CROSS-REFERENCE TO RELATED APPLICATIONS

This application is a continuation of U.S. application Ser. No. 16/921,796 filed Jul. 6, 2020, entitled "PERFORMING AUTONOMOUS PATH NAVIGATION USING DEEP NEURAL NETWORKS," which is a continuation of U.S. application Ser. No. 15/939,116, filed on Mar. 28, 2018, now U.S. Pat. No. 10,705,525, entitled "PERFORMING AUTONOMOUS PATH NAVIGATION USING DEEP NEURAL NETWORKS," which claims the benefit of U.S. Provisional Application No. 62/483,155, filed on Apr. 7, 2017, entitled "LOW-FLYING AUTONOMOUS DRONE TRAIL NAVIGATION USING DEEP NEURAL NETWORKS," the entire contents of which are incorporated herein by reference.

This application also incorporates by reference for all purposes the full disclosures of co-pending U.S. patent application Ser. No. 17/692,730, filed concurrently herewith, entitled "PERFORMING AUTONOMOUS PATH NAVIGATION USING DEEP NEURAL NETWORKS."

FIELD OF THE INVENTION

The present invention relates to autonomous vehicle navigation, and more particularly to analyzing image data using deep neural networks in order to produce vehicle navigation information.

BACKGROUND

Autonomous control is a desirable feature for implementation into vehicles. However, current control implementations are often inaccurate and inefficient, as well as unaware of an environment surrounding the vehicle.

Thus, there is a need for addressing these issues and/or other issues associated with the prior art.

SUMMARY

A method, computer readable medium, and system are disclosed for performing autonomous path navigation using deep neural networks. The method includes the steps of receiving image data at a deep neural network (DNN), determining, by the DNN, both an orientation of a vehicle with respect to a path and a lateral position of the vehicle with respect to the path, utilizing the image data, and controlling a location of the vehicle, utilizing the orientation of the vehicle with respect to the path and the lateral position of the vehicle with respect to the path.

DETAILED DESCRIPTION

Figure 1:
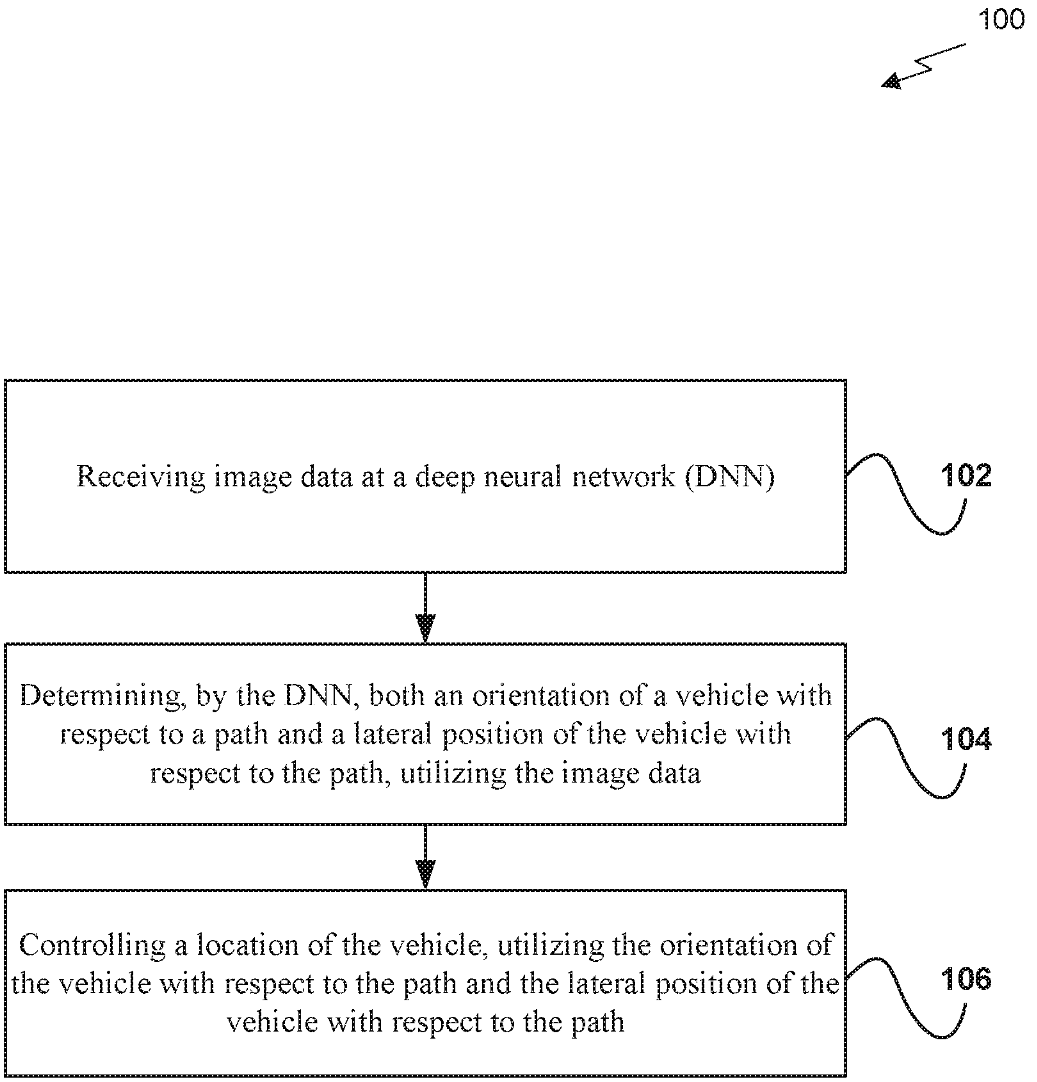
FIG. 1 illustrates a flowchart of a method for performing autonomous path navigation using deep neural networks, in accordance with one embodiment.

FIG. 1 illustrates a flowchart of a method 100 for performing autonomous path navigation using deep neural networks, in accordance with one embodiment. As shown in operation 102, image data is received at a deep neural network (DNN). In one embodiment, the image data may include a pictorial image. In another embodiment, the image data may include a plurality of pictorial images. In yet another embodiment, the image data may be derived from video data (e.g., streaming video, etc.).

Additionally, in one embodiment, the image data may include optical data, infrared data, light detection and ranging (LIDAR) data, radar data, depth data, sonar data, etc. In another embodiment, the image data may include stereo image data received from a plurality of imaging devices. In yet another embodiment, the image data may be received from one or more imaging devices. For example, the image data may be received from a digital imaging camera, a radar device, a LIDAR device, an infrared imaging device, a sonar imaging device, etc.

Further, in one embodiment, the image data may be received in real-time from the one or more imaging devices. In another embodiment, the image data may be received from one or more hardware imaging devices, utilizing middleware (e.g., a robotic operating system (ROS), etc.). In yet another embodiment, the image data may be received at a vehicle that includes the one or more imaging devices. For example, the vehicle may include any controlled mobile object, such as an automobile, airplane, amphibious vehicle (e.g., a boat, hydroplane, etc.) drone, micro aerial vehicle (MAV), rover, etc. In another example, the middleware may be running on hardware installed within the vehicle. In yet another example, the one or more cameras may be installed within the vehicle.

Further still, in one embodiment, the image data may indicate a current location of the vehicle on a path. For example, the one or more imaging devices may be mounted on the vehicle such that the image data created by the one or more imaging devices indicates the current location of the vehicle on the path. In another embodiment, the DNN may include a supervised classification network.

For example, the image data may include supervised data that is correctly labeled with an associated position. In another example, the DNN may be trained with image data having associated correct labels. In another embodiment, the DNN may implement a loss function. For example, the DNN may determine a label for the image data, compare the label to the associated correct label for the image data, and may compute a difference between the labels. In another example, the DNN may be adjusted, based on the difference between the labels, using back propagation.

In this way, the DNN may be more likely to correctly label image data during subsequent iterations.

Also, as shown in operation 104, the DNN determines both an orientation of a vehicle with respect to a path and a lateral position of the vehicle with respect to the path, utilizing the image data. In one embodiment, the path may include any course that may be identified visually within the image data. In another embodiment, the path may include a trail, one or more tracks (e.g., train tracks, tire tracks, etc.), one or more power lines, a street, a culvert (e.g., a sewer culvert, etc.), an urban canyon, etc.

In addition, in one embodiment, the vehicle may include the vehicle running middleware and the one or more imaging devices. In another embodiment, the vehicle may currently be in motion (e.g., along the path, etc.). In yet another embodiment, the orientation with respect to the path may include a plurality of probabilities. For example, the orientation with respect to the path may include a probability that a vehicle is currently facing left with respect to the path, a probability that a vehicle is currently facing right with respect to the path, and a probability that a vehicle is currently facing straight with respect to the path. In another example, each of the plurality of possibilities may be represented numerically, resulting in three numbers output by the DNN that indicate the orientation with respect to the path.

Furthermore, in one embodiment, the lateral position with respect to the path may include a plurality of probabilities. In another embodiment, the lateral position with respect to the path may identify a probability of a plurality of lateral offsets with respect to the path center. For example, the lateral position with respect to the path may include a probability that a vehicle is currently shifted left with respect to the path, a probability that a vehicle is currently shifted right with respect to the path, and a probability that a vehicle is centered with respect to the path. In another example, each of the plurality of possibilities may be represented numerically, resulting in three numbers output by the DNN that indicate the lateral position with respect to the path.

Further still, in one embodiment, the orientation and lateral position may be determined in real-time within the vehicle. In another embodiment, the image data may be sent from the vehicle to a remote location (e.g., a distributed computing environment), and the orientation and lateral position may be determined at the remote location.

In this way, both rotation and translation data may be determined by the DNN, utilizing the image data.

Also, as shown in operation 106, a location of the vehicle is controlled, utilizing the orientation of the vehicle with respect to the path and the lateral position of the vehicle with respect to the path. In one embodiment, the orientation of the vehicle with respect to the path and the lateral position of the vehicle with respect to the path may be converted into steering directions. For example, the conversion may be performed by a controller module. In another example, the steering directions may include one or more steering signals (e.g., a steering angle, etc.).

Additionally, in one embodiment, the steering directions may be converted into another protocol to create converted steering directions. For example, the steering directions may be converted from a middleware protocol (e.g., a ROS protocol, etc.) to a vehicle control protocol. In another example, the conversion may be performed by a communication module.

Furthermore, in one embodiment, the converted steering directions may be sent to a vehicle systems module to control one or more steering mechanisms of the vehicle. For example, the one or more steering mechanisms of the vehicle may control a direction in which the vehicle is moving. In another example, the converted steering directions may be sent to the vehicle systems module utilizing a communication protocol.

Further still, in one embodiment, the one or more steering mechanisms may be adjusted, based on the converted steering directions. For example, the one or more steering mechanisms may be adjusted by the vehicle systems module to move the vehicle laterally to the center of the path. In another example, the one or more steering mechanisms may be adjusted to move the vehicle so that the orientation of the vehicle is straight with respect to the path. In another embodiment, the vehicle location controlling may be performed in real-time within the vehicle.

Also, in one embodiment, the DNN may control directional stability by utilizing predictions with a reduced confidence. For example, the DNN may implement a classification scheme with a reduced confidence for more smooth and stable vehicle direction control.

In addition, in one embodiment, a second DNN may perform object detection within the path. For example, the second DNN may be included within the vehicle and may communicate to other modules within the vehicles (e.g., via middleware, etc.). In another example, the second DNN may receive the image data, and may output object data indicating whether an object (e.g., a person, animal, etc.) is in the image data. In yet another example, the object data may be sent from the second DNN to the controller module (e.g., via middleware, etc.). In still another example, the controller module may determine whether a size of the object in the image data is a predetermined percentage of a size of the image in the image data.

Further, in one example, the controller module may send one or more commands to the vehicle systems (e.g., to change a course of the vehicle, to stop a functioning of the vehicle, etc.) in response to determining that the size of the object in the image data is equal to or greater than the predetermined percentage of the size of the image in the image data. This may provide a safety mechanism that may stop the vehicle when an object of a predetermined size is on the path.

Further still, in one embodiment, a third DNN may perform obstacle detection associated with the path. For example, the third DNN may be included within the vehicle and may communicate to other modules within the vehicles (e.g., via middleware, etc.). In another example, the third DNN may receive the image data, and may output obstacle data such as a set of weights indicating a likelihood of one or more obstacles at various locations and distances along the path. For instance, the third DNN may implement simultaneous localization and mapping (SLAM) to identify a location of the vehicle within a scene indicated by the image data and provide information about a relative location of static objects within the scene.

Also, in one example, the obstacle data may be sent from the third DNN to the controller module (e.g., via middleware, etc.). In another example, the controller module may adjust the location of the vehicle, utilizing the obstacle data. This may help the vehicle avoid static obstacles in an alongside the path.

In this way, a vehicle may be autonomously controlled, utilizing steering directions derived from DNN analysis of image data. Additionally, a DNN may perform an estimation of both vehicle orientation (3 classes) and lateral position with respect to path (3 more classes), for a total of 6 classes. Further, a loss function may be implemented during specific DNN training. Further still, a reduced confidence implementation may be performed within a DNN. Also, object and obstacle detection may be performed during autonomous navigation via additional DNNs. In addition, these features may be implemented utilizing on-board, real-time processing.

Parallel Processing Architecture

Figure 2:
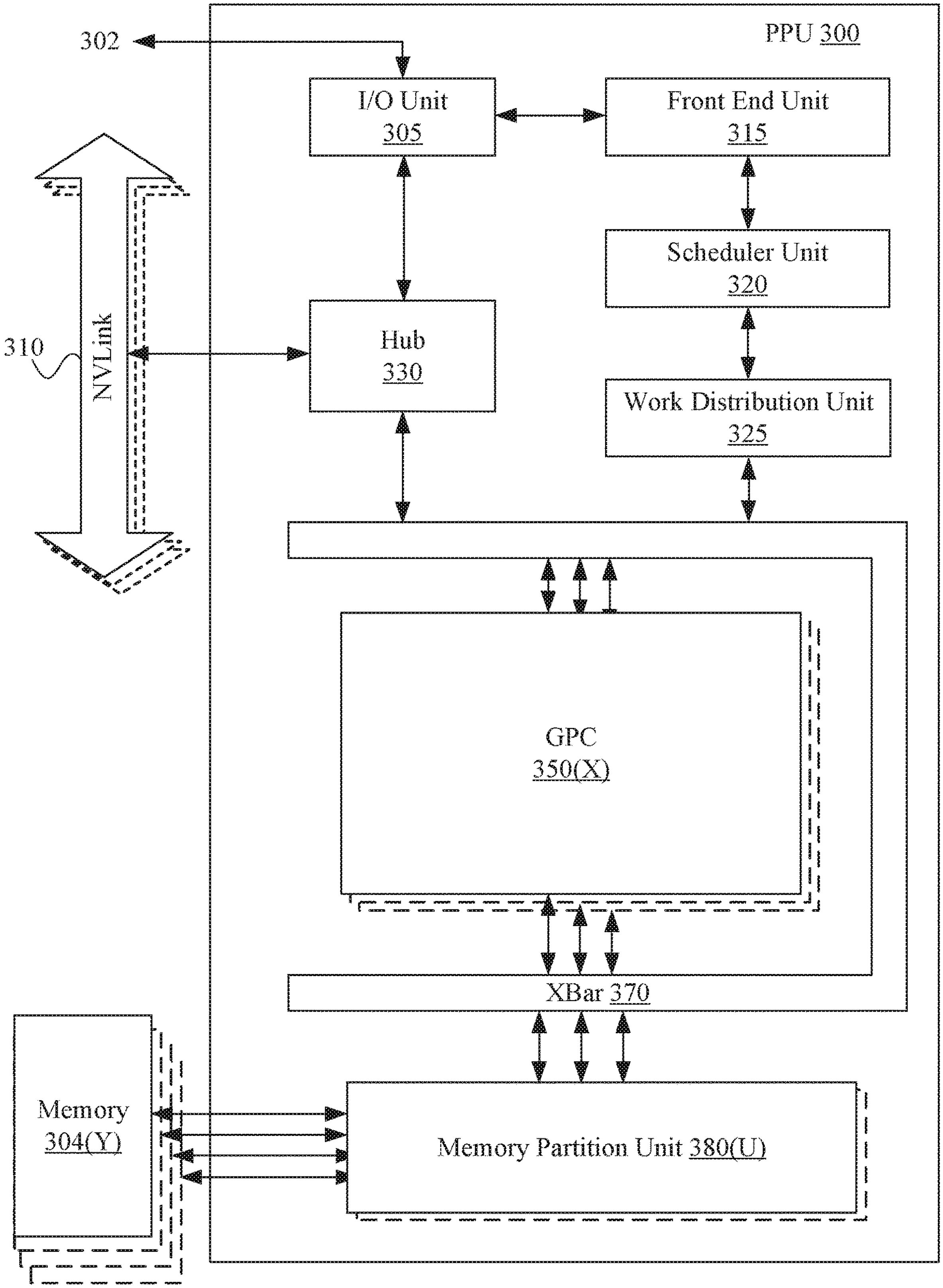
FIG. 2 illustrates a parallel processing unit, in accordance with one embodiment.

FIG. 2 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the interconnect 302 via memory requests transmitted over the interconnect 302 by the I/O unit 305. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5.

Figure 3:
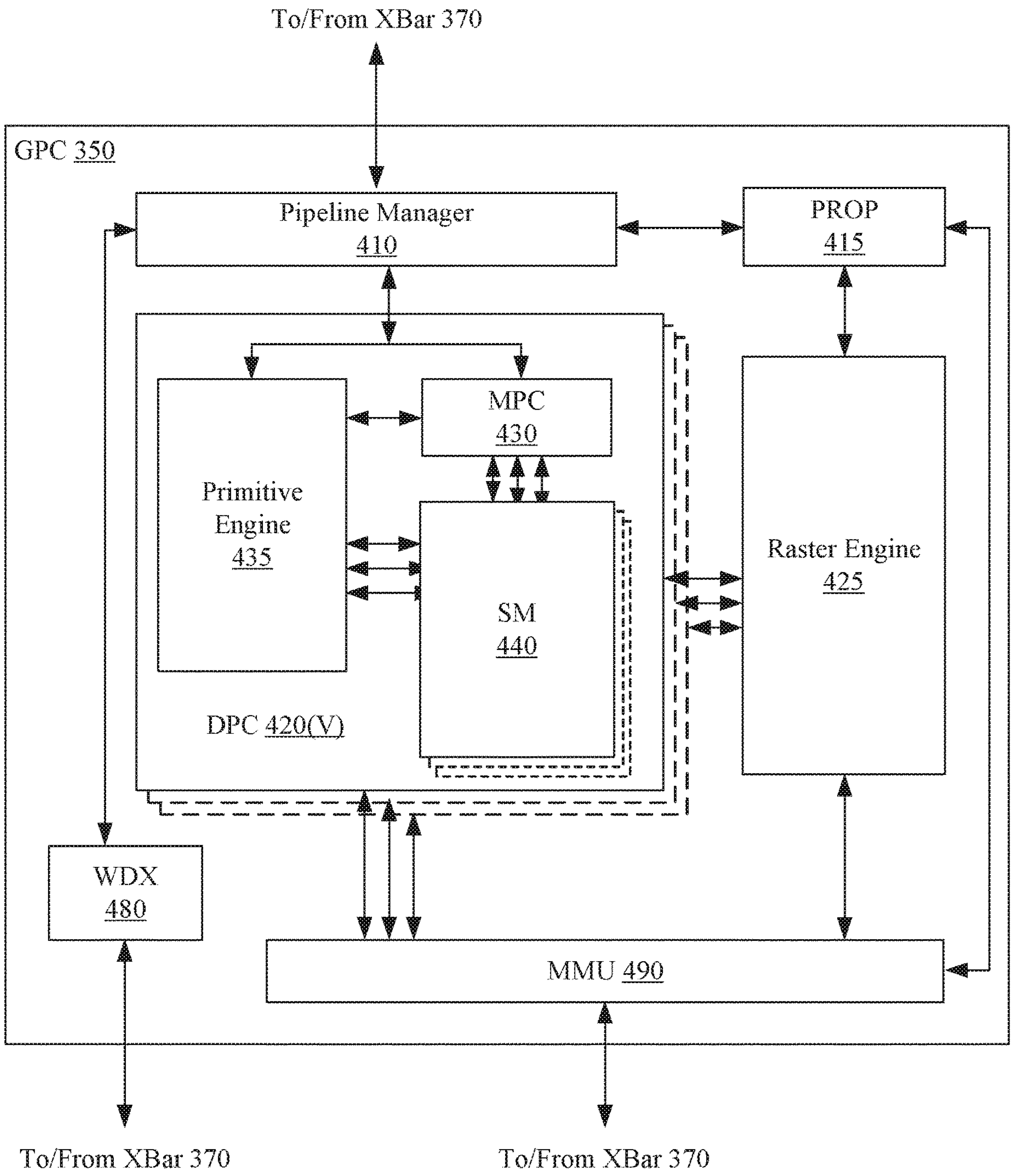
FIG. 3 illustrates a general processing cluster within the parallel processing unit of FIG. 2, in accordance with one embodiment.

FIG. 3 illustrates a GPC 350 of the PPU 300 of FIG. 2, in accordance with one embodiment. As shown in FIG. 3, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 3 may include other hardware units in lieu of or in addition to the units shown in FIG. 3.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4:
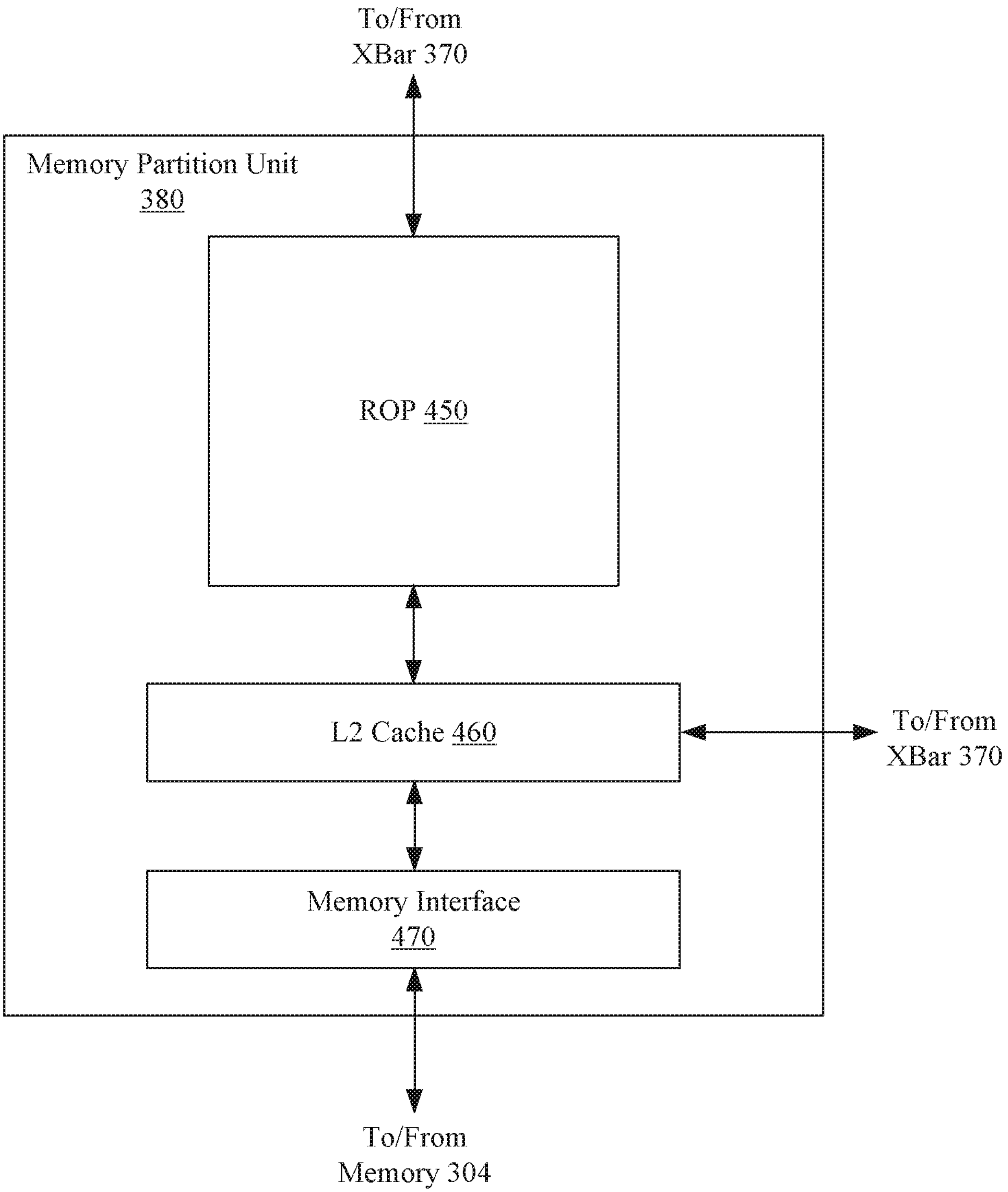
FIG. 4 illustrates a memory partition unit of the parallel processing unit of FIG. 2, in accordance with one embodiment.

The PROP unit 415 is configured to route data generated by the raster engine 425 and the DPCs 420 to a Raster Operations (ROP) unit in the partition unit 380, described in more detail in conjunction with FIG. 4. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4 illustrates a memory partition unit 380 of the PPU 300 of FIG. 2, in accordance with one embodiment. As shown in FIG. 4, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory (GDDR5 SDRAM).

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370.

Figure 5:
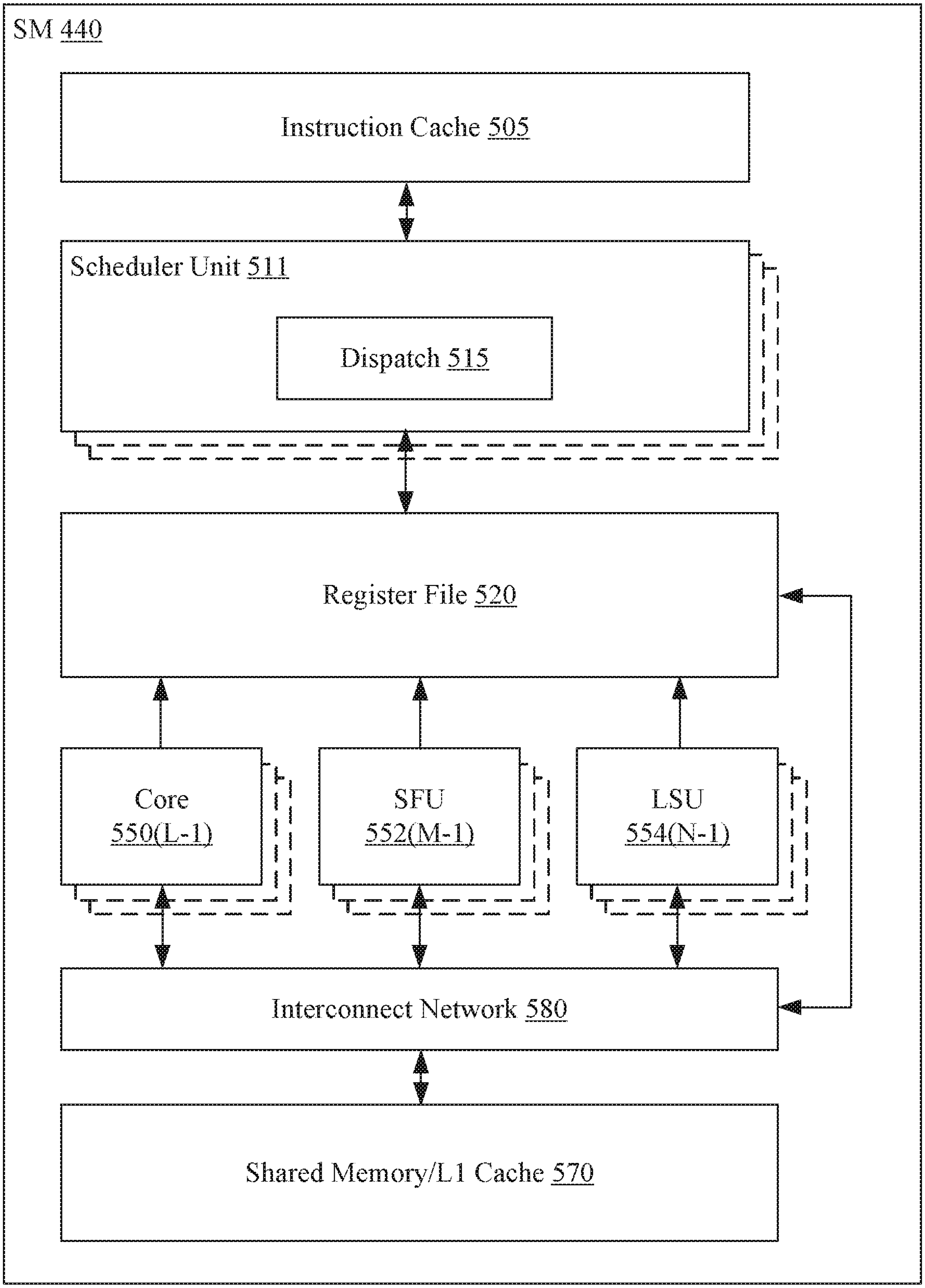
FIG. 5 illustrates the streaming multi-processor of FIG. 3, in accordance with one embodiment.

FIG. 5 illustrates the streaming multi-processor 440 of FIG. 3, in accordance with one embodiment. As shown in FIG. 5, the SM 440 includes an instruction cache 505, one or more scheduler units 511, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 511 receives the tasks from the work distribution unit 325 and manages instruction scheduling for one or more thread blocks assigned to the SM 440. The scheduler unit 511 schedules thread blocks for execution as warps of parallel threads, where each thread block is allocated at least one warp. In one embodiment, each warp executes 32 threads. The scheduler unit 511 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 511 includes two dispatch units 515 that enable two different instructions from the same warp to be dispatched during each clock cycle. In alternative embodiments, each scheduler unit 511 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D, are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased.

Figure 6:
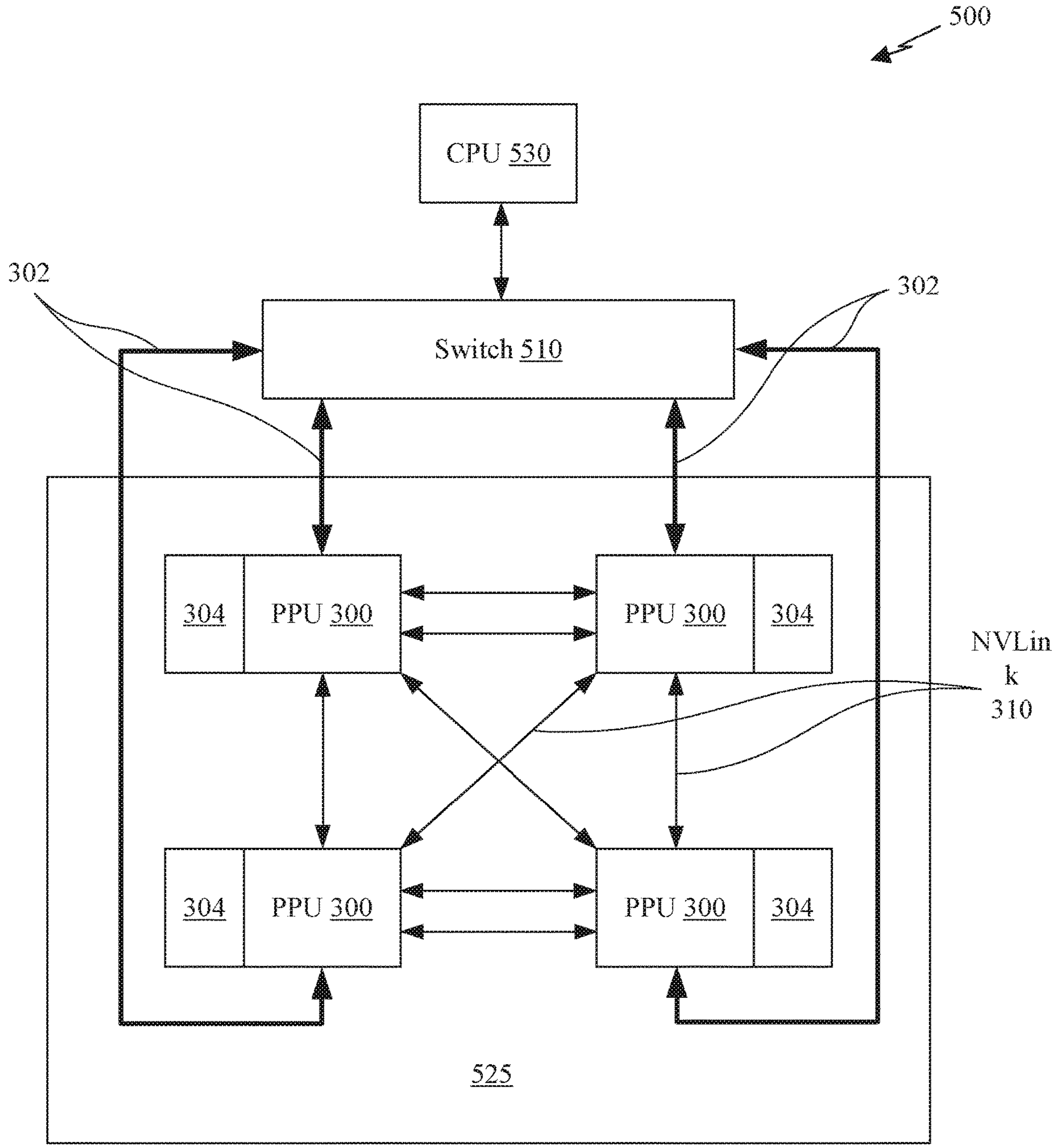
FIG. 6 is a conceptual diagram of a processing system implemented using the PPU of FIG. 2, in accordance with one embodiment.

FIG. 6 is a conceptual diagram of a processing system 500 implemented using the PPU 300 of FIG. 2, in accordance with one embodiment. The exemplary system 565 may be configured to implement the method 100 shown in FIG. 1. The processing system 500 includes a CPU 530, switch 510, and multiple PPUs 300 each and respective memories 304. The NVLink 310 provides a high-speed communication links between each of the PPUs 300. The switch 510 interfaces between the interconnect 302 and the CPU 530. The PPUs 300, memories 304, and NVLinks 310 may be situated on a single semiconductor platform to form a parallel processing module 525.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 6, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 6, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 7:
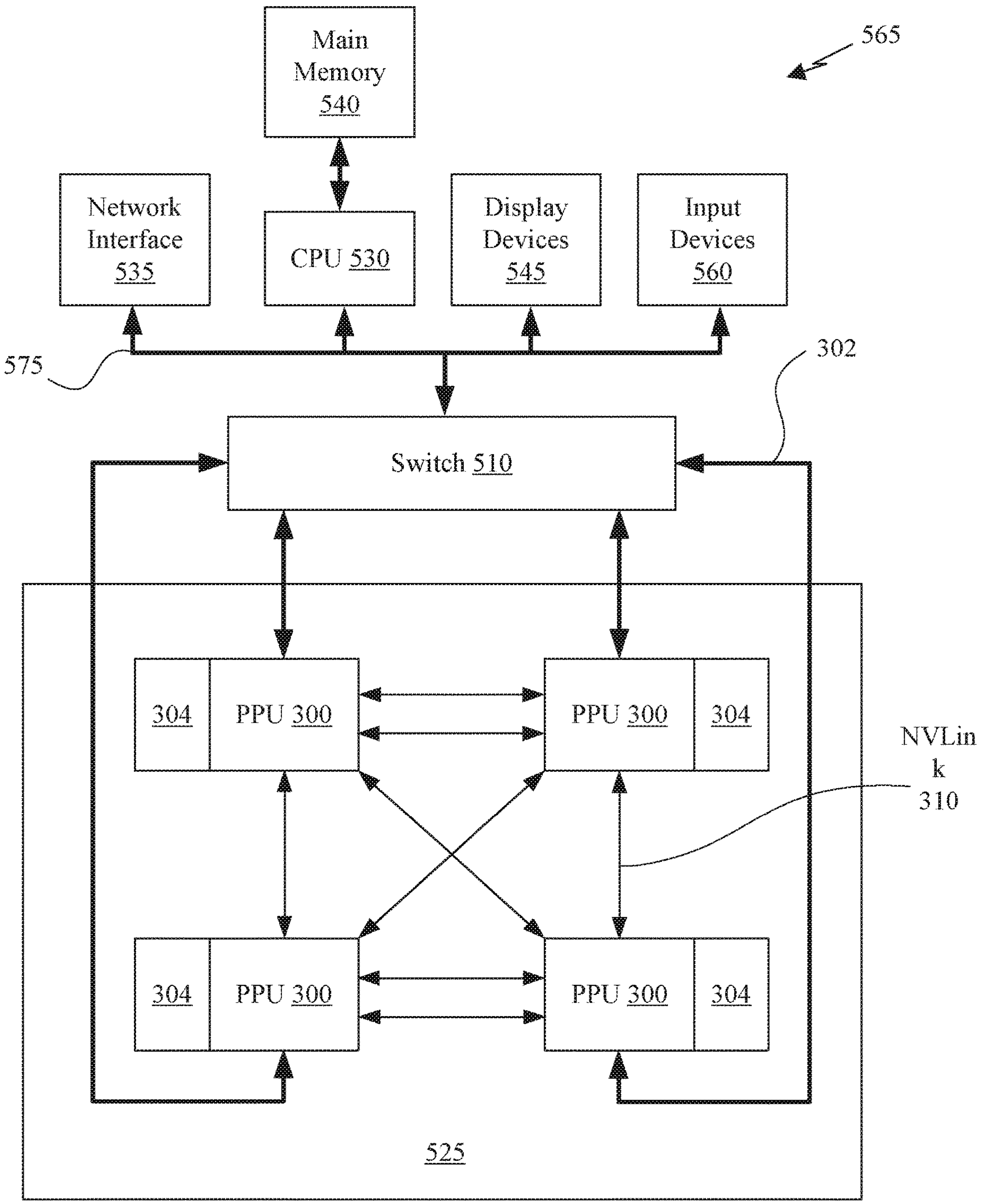
FIG. 7 illustrates an exemplary system in which the various architecture and/or functionality of the various previous embodiments may be implemented.

FIG. 7 illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e., a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Figure 8:
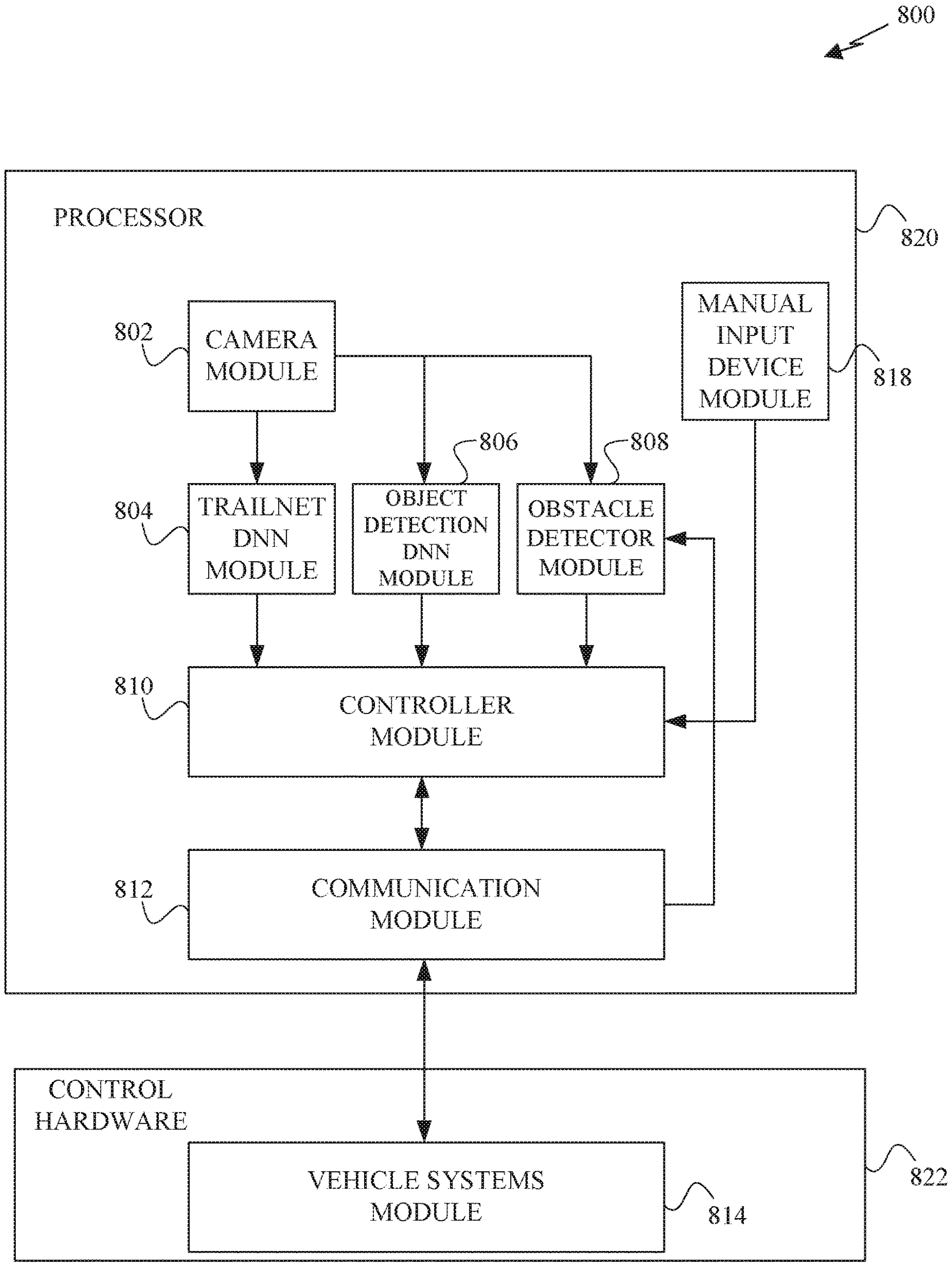
FIG. 8 illustrates an exemplary system for performing autonomous path navigation using deep neural networks, in accordance with one embodiment.

FIG. 8 illustrates an exemplary system 800 for performing autonomous path navigation using deep neural networks, according to one embodiment. As shown, the system 800 includes a camera module 802 in communication with a TrailNet DNN module 804, an object detection DNN module 806, and an obstacle detector module 808. In one embodiment, the camera module 802 may provide visualization data (e.g., image data, radar data, depth data, lidar data, infrared data, sonar data, etc.) to the TrailNet DNN module 804, the object detection DNN module 806, and the obstacle detector module 808. In another embodiment, the camera module may manage one or more cameras of a variety of different types within a vehicle.

Additionally, in one embodiment, the TrailNet DNN module 804 may receive visualization data from the camera module 802, and may output vehicle location information. For example, the TrailNet DNN module 804 may output three numbers that indicate the orientation of the vehicle with respect to the path, and three numbers output by the DNN that indicate the lateral position of the vehicle with respect to the path.

Further, in one embodiment, the object detection DNN module 806 may receive visualization data from the camera module 802, and may output an indication as to whether a person or large animal is present within the visualization data (e.g., utilizing a DNN such as a YOLO DNN, etc.). In another embodiment, the obstacle detector module 808 may receive visualization data from the camera module 802, and may output a set of weights indicating a likelihood of obstacles at various locations and distances (e.g., utilizing simultaneous location and mapping (SLAM), etc.). In this way, the obstacle detector module 808 may identify a location of a camera within a scene, and may provide information about a relative location of static objects within the scene.

Further still, the system 800 includes a controller module 810. In one embodiment, the controller module 810 may receive vehicle location information from the TrailNet DNN module 804 (e.g., representing the vehicle's path orientation and lateral position), and may create steering directions (e.g., a steering angle for the vehicle, etc.), utilizing the vehicle location information.

Also, the system 800 includes a communication module 812. The communication module 812 may receive the steering directions in a first format (e.g., a ROS protocol, etc.) from the controller module 810, and may convert then to messages in a second format (e.g., a MAV protocol, etc.). The communication module 812 may then broadcast the converted messages in the second format to a vehicle systems module 814, utilizing a communication protocol 816.

In addition, in one embodiment, the vehicle systems module 814 may receive the converted messages, and may use such messages to control one or more physical components of the vehicle (e.g., in order to control movement of the vehicle, etc.). In this way, the controller module 810 may compute steering directions and send the steering directions to the communication module 812, which may convert the directions to a different format and send them to the vehicle systems module 814 for implementation at the vehicle.

Further, the system 800 includes a manual input device module 818. The manual input device module 818 may receive input from a user (e.g., a startup indicator, a kill switch selection, a manual override selection, etc.), and may send such information to the controller module 810. In this way, manual user input may be provided to the system 800.

Further still, the camera module 802, the TrailNet DNN module 804, the object detection DNN module 806, the obstacle detector module 808, the controller module, the communication module 812, and the manual input device module 818 are all implemented within a single processor 820. Communication between such modules may be made using a predetermined protocol (e.g., a ROS protocol, etc.). The vehicle systems module 814 is implemented within control hardware 822 of the vehicle that is separate from the processor 820.

Low-Flying Autonomous MAV Trail Navigation Using Deep Neural Networks for Environmental Awareness Introduction In one embodiment, autonomously following a man-made trail in the forest is a challenging problem for robotic systems. Applications for such a capability include, among others, search-and-rescue, environmental mapping, wilderness monitoring, and personal videography. Micro aerial vehicles (MAVs) offer a number of advantages for solving this problem: they are not limited by the difficulty or traversability of the terrain, they are capable of high speeds, and they have the ability to quickly switch from one trail to another by flying through or over the forest.

In order for a complete MAV system to follow a trail, it may not only detect the trail in order to determine its steering commands, but it also may be aware of its surroundings. An MAV that lacks such a capability is in danger of colliding with overhanging branches or, even worse, with people or pets using the trail. Environmental awareness is therefore one component for trail-following robots, particularly for low-flying MAVs.

In one embodiment, a MAV system is provided for autonomous trail following. The system may use a deep neural network (DNN) (called TrailNet in this example) for determining the MAV's view orientation and lateral offset within the trail. The computed pose may then be used for continuous control to allow the MAV to fly over forest trails. In addition, vision modules for environmental awareness may enable the MAV to detect and avoid people and pets on the trail, as well as to estimate depth in front of the robot for the purpose of reactively avoiding obstacles. All subsystems may run simultaneously in real time on board the MAV using a standalone computing device. On-board processing may be used to ensure the safety of this mission-critical system.

In one embodiment, a hardware/software system may be implemented for environmentally aware autonomous trail navigation using DNNs that may run in real time on board an MAV.

In another embodiment, a DNN architecture may be implemented for trail detection with improved accuracy and computational efficiency via a less confident classification scheme for more stable control as well as additional categories for estimating both view orientation and lateral offset.

In yet another embodiment, a methodology for retraining a DNN may be implemented with 6 categories (for view orientation and lateral offset) by transfer learning from a network with 3 categories (orientation only).

System Description

To ensure a robust and flexible platform for forest flight experiments, inexpensive off-the-shelf components may be used. One exemplary hardware setup may include a quadcopter or drone with autopilot software, an integrated computing device, and a carrier board. The vision processing may use a forward-facing camera. All processing may be done on the integrated computing device.

The MAV may be equipped with a downward-facing, high framerate optical flow sensor with sonar and lidar. Developed the flow sensor may provide reliable metric position and attitude estimation by computing 2D optical flow on the ground, then using ground distance measurements and gyro readings to compute vehicle ground speed. Once computed, this speed may be sent to an extended Kalman filter (EKF) running on flight controller hardware to be fused with other sensor measurements (e.g., IMU) for even more precise state estimation.

Figure 9:
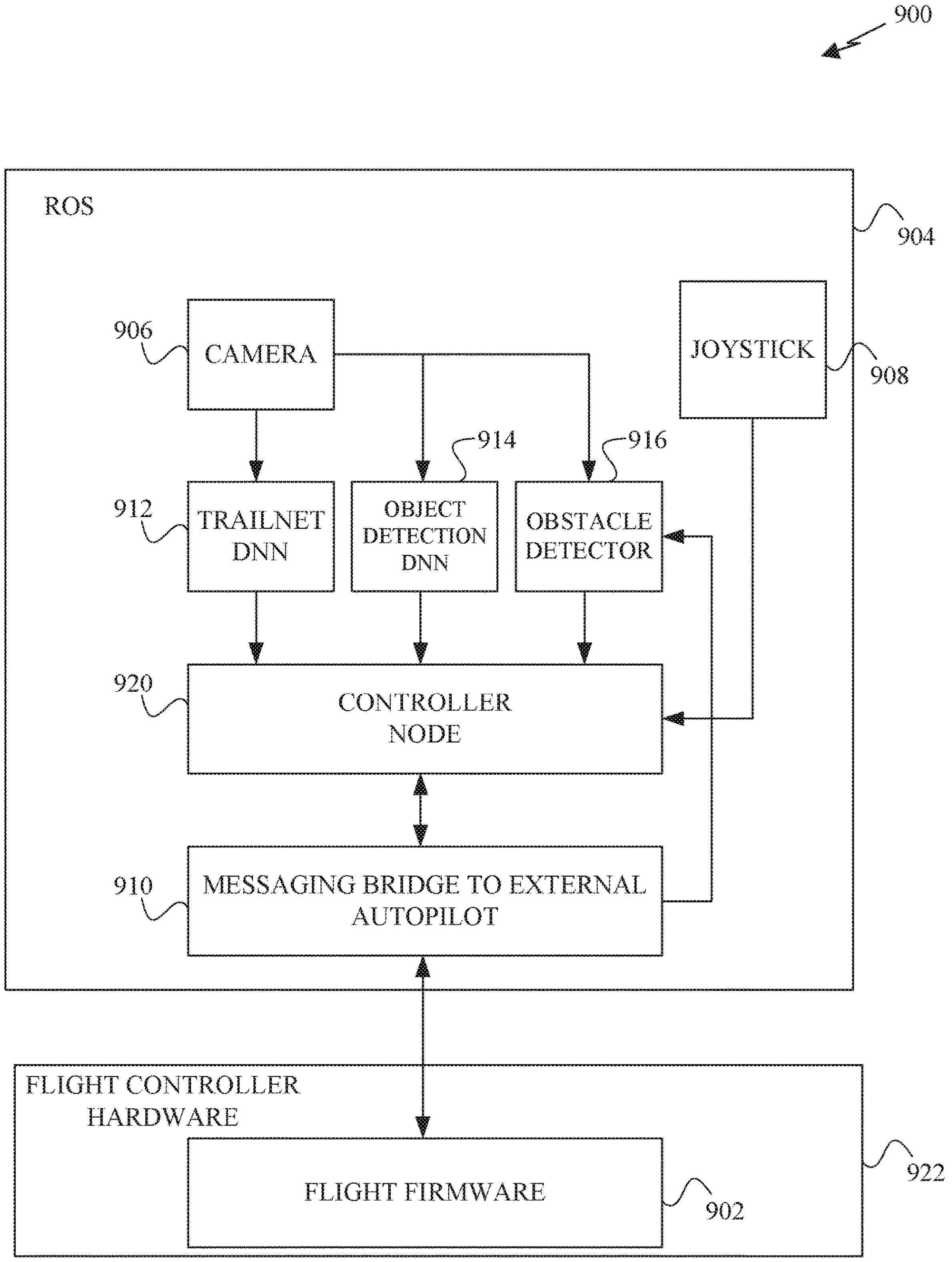
FIG. 9 illustrates an exemplary software architecture, in accordance with one embodiment.

The diagram in FIG. 9 illustrates an exemplary software architecture 900, according to one embodiment. A flight stack may be used as firmware 902 for the flight controller hardware autopilot 922. The flight firmware 902 may provide flexible and robust control over a range of MAV configurations. It may include software-in-the-loop (SITL) simulation, which may be used for controller testing and debugging. The on-board computer may communicate with the flight firmware 902 via a predetermined protocol (e.g., MavLink, etc.). The Robotic Operating System (ROS) 904 may be run on the on-board computer. As shown in FIG. 9, the architecture 900 uses the following ROS nodes 906-910: a camera driver node 906 for reading USB camera input, a joystick driver node 908 for reading game controller commands used for teleoperation (e.g., during training and for emergency override), and a messaging bridge to external autopilot module 910 for communicating with the flight firmware 902.

In one embodiment, vision processing may be performed by three nodes 912-916. A TrailNet DNN node 912 applies a trained TrailNet DNN. An object detection node 914 runs real-time object detection DNN. An obstacle detector node 916 runs a visual odometry algorithm, whose output may be converted to a camera-centric depth map for obstacle detection and avoidance.

The controller node 920 may be responsible for computing desired movement commands (waypoints) per current TrailNet DNN predictions, detected obstacles/objects and teleoperation commands. For safety, the teleoperation commands may take precedence over DNN predictions, so a human operator may override the MAV at any time to prevent undesirable movements. The computed waypoint may then be sent to the messaging bridge to external autopilot module 910 which resubmits it to the flight firmware 902 via a communication protocol 918. A right-handed ENU (east-north-up) inertial coordinate frame may be used for waypoint computation, which may be converted to the flight firmware 902's right-handed NED (north-east-down) coordinate frame.

Vision Based Processing

This section describes the processing performed by the three nodes 912-916 using a forward-facing camera.

Estimating Lateral Offset and View Orientation with DNN

Figure 10:
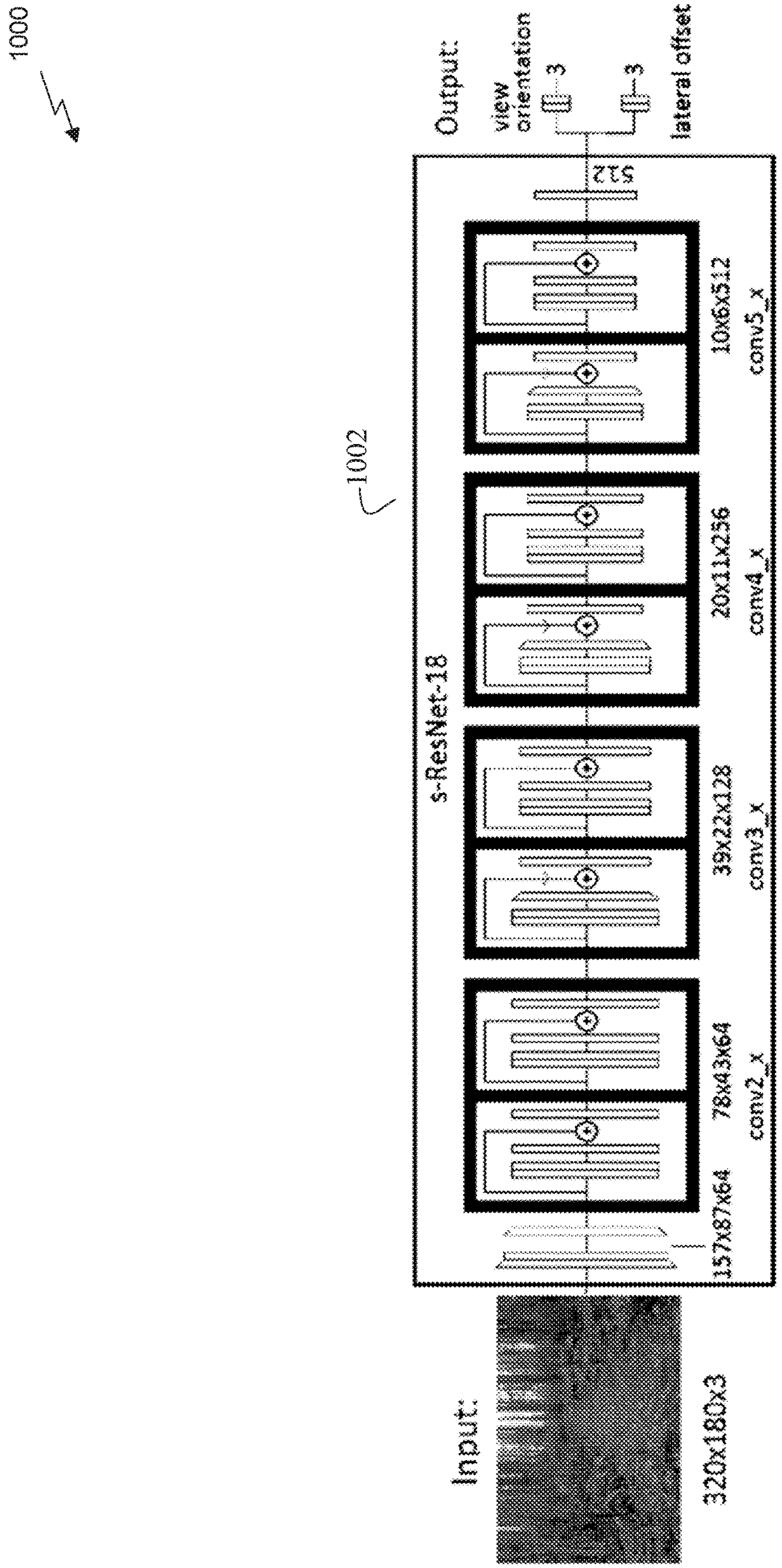
FIG. 10 illustrates an exemplary TrailNet DNN node implementing a deep neural network (DNN), in accordance with one embodiment.

FIG. 10 shows an exemplary TrailNet DNN node 1000 implementing a deep neural network (DNN) 1002 that is used for estimating the MAV's lateral offset and view orientation with respect to the trail, according to one embodiment. The DNN 1002 may include a ResNet-18 with one or more changes (e.g., removed batch normalization, replaced ReLUs with shifted ReLU (SReLU), activation functions, which are computationally efficient approximations to the highly effective exponential linear units (ELUs), a double-headed fully connected output layer, etc.).

In one embodiment, the TrailNet DNN architecture may be used to determine the MAV's view orientation and lateral offset with respect to the trail center. The network (labeled s-ResNet-18) may include a ResNet-18 architecture, but without batch normalization and with ReLU replaced by shifted ReLU. The first convolution layer may be 7×7, whereas all the others may be 3×3. Some layers may downsample using stride of 2; all others may use a stride of 1. All weights except the lateral offset layer may be trained with the ID SIA trail dataset, after which these weights may be frozen, and the lateral offset layer weights may be trained with a dataset. A final joint optimization step may also be performed.

In another embodiment, classification may be performed with soft labels, rather than regression, because of the ease of data collection and labeling, as well as reduced sensitivity to noise. In one embodiment, the network may output 6 categories rather than 3 to capture not only the 3 orientations with respect to the trail (facing left/facing center/facing right) but also the 3 lateral offsets (shifted left/centered/shifted right) with respect to the trail center. These additional categories may help provide more accurate state estimation and reliable trail following. With just 3 categories, if the MAV flies close to the trail edge but parallel to the trail, the DNN may not cause it to turn, because it is already oriented straight. Eventually, this negligence may cause it to hit tree branches near the edge. Thus, robust navigation is precluded with just 3 categories, because of the difficulty of resolving the ambiguity of needing to turn to correct an orientation error, and needing to fly in a non-straight path to correct a lateral offset error.

Training DNNs may requires large amounts of data. One exemplary approach to training the 6-category DNN applies principles of transfer learning. A 3-category DNN may be trained to predict view orientation (left/center/right), using a trail dataset. This dataset may include footage of hikes recorded by 3 cameras (aimed left 30, straight, and right 30), with enough cross-seasonal and landscape variety to train all but the lateral offset layers of the network.

To train the rest of the network, a dataset may be collected (e.g., using a 3-camera rig), in which cameras are mounted on a bar (so the distance between adjacent cameras is a predetermined distance). Data may be gathered over several trails by recording video footage of all cameras simultaneously as the cameras are moved along a middle of the trail. The videos may be cropped (e.g., to 60 horizontal FOV, etc.) and may be used to train the second 3-category head of the network used to predict lateral offset (left/center/right), while freezing all the other weights.

In one embodiment, setting a predetermined baseline between cameras may enable the network to disambiguate lateral offset from view orientation.

During training, a data augmentation pipeline may be used, including: random horizontal flips (with appropriate label changes); random contrast (e.g., 0.2 radius), brightness (e.g., 0.2 radius), saturation (e.g., 0.4 radius), sharpness (e.g., 0.3 radius) and jitter with random permutations of these transformations; random scale jitter (e.g., min: 0.9, max: 1.2); random rotations (e.g., max abs angle: 15); and random crops.

In another embodiment, one or more loss functions may be used. For example, the following loss function may be implemented during training:

$$\mathcal{L} = \underbrace{-\sum_i p_i \ln(y_i)}_{\text{cross entropy}} - \underbrace{\lambda_1 \left(-\sum_i y_i(\ln(y_i))\right)}_{\text{entropy reward}} + \underbrace{\lambda_2 \phi(y)}_{\text{side swap penalty}} \tag{1}$$

where $p_i$ and $y_i$ are the smoothed ground truth label and network prediction of category $i \in \{\text{left, center, right}\}$, respectively, y is a 3-element vector containing all $y_i$, $\lambda_1$ and $\lambda_2$ are scalar weights, and the side swap penalty penalizes gross mistakes (i.e., swapping left and right):

$$\phi(y) = \begin{cases} y_{left} & \text{if } \hat{i} = \text{right} \\ y_{right} & \text{if } \hat{i} = \text{left} \\ 0 & \text{if } \hat{i} = \text{center} \end{cases} \tag{2}$$

where $\hat{i} = \arg\max_i p_i$ is the ground truth category. This loss function may be used for training both the view orientation and lateral offset heads of the network. Label smoothing in the first term and the entropy reward term together may help reduce overconfident behavior of the network, which may help enable stable flight.

Additionally, in one embodiment, a controller may be implemented to mix probabilistic DNN predictions. This design may simplify transforming DNN predictions into flight commands. Each time the TrailNet DNN sends its prediction, the controller may compute a small counter-clockwise turning angle $\alpha$ by:

$$\alpha = \beta_1(y^{vo}_{right} - y^{vo}_{left}) + \beta_2(y^{\ell o}_{right} - y^{\ell o}_{left}), \tag{3}$$

which is the weighted sum of differences between the right and left predictions of the view orientation (vo) and lateral offset ($\ell o$) heads of the network, where $\beta_1$ and $\beta_2$ are scalar angle parameters that control turning speed. We may set $\beta_1=\beta_2=10°$.

Once the turn angle is known, a new waypoint may be computed that is located some distance in front of the MAV and at a turn angle relative to MAV's body frame. The distance to the waypoint may affect the vehicle's speed. We set the orientation to face the new waypoint direction. The waypoint is converted to the inertial frame and sent (with a fixed distance to the ground) to the messaging bridge to external autopilot module for autopilot flight plan execution.

Object Detection with DNN

For safety, system collision avoidance may be implemented. An object detection DNN may be responsible for detecting objects, which may not be visible to the obstacle detector module if they are independently moving. For each detected object, the network may provide bounding box image coordinates. When the box size exceeds a threshold percentage of the image frame, the controls from Equation (3) may be overridden to cause the MAV to stop and hover.

One exemplary DNN that may be used for object detection is based on a YOLO DNN with modifications to allow efficient execution using an integrated computing device. The network may be retrained on one or more datasets.

Obstacle Detection and Avoidance with Monocular SLAM

In addition to higher-level navigation tasks such as trail following and semantic object detection, an autonomous MAV may be able to quickly detect and avoid obstacles in its path, even if these obstacles have never been seen before (and are therefore not available for training). Such obstacles can be static, such as trees or walls, or dynamic, such as people, animals, or moving vehicles. For safety reasons, the system may be robust in the presence of complex, highly dynamic environments such as forest trails, and in the face of changes in lighting, shadows, and pose.

One approach to low-level obstacle detection may include stereo-based matching. Monocular techniques may also be used, including depth-from-single-image techniques using machine learning and deep learning methods. Another technique may estimate depth using a monocular video stream.

In one embodiment, a direct sparse odometry (DSO) method may be used. For example, DSO may compute semi-dense 3D maps of the environment and may be computationally efficient. The DSO method may be run on the ARM architecture of the integrated computing device. On this platform, the DSO may provide updates to the camera pose estimates as well as the depth image, and may update its keyframes.

During flight, the DSO may provide an estimate of the camera's global pose xdso and an inverse depth image Idso. Using the rectified camera intrinsics, Idso may be converted into a 3D point cloud in the local space of the camera. To use these points for navigation or obstacle detection, they may be put in the MAV's frame of reference, including proper metric scale. This similarity transform may be determined using the odometry information provided by the MAV's other sensors.

Specifically, at any given time the optical flow sensor may be used to generate an estimate of the current pose (xmav) of the vehicle in the inertial frame. When the visual odometry system provides an xdso, Idso pair, it may be associated with the latest pose. Once several of these measurement pairs have been generated, Procrustes analysis may be used to generate the rigid similarity transformation between the MAV's frame of reference and that of the visual odometry measurements. This transform may then be used to put the points extracted from Idso into the MAV's frame of reference, where nearby objects may then be detected. The set of measurement pairs (xdso paired with xmav) may be updated when the MAV's motion generates sufficient parallax. These pairs may be kept in a circular buffer, so eventually older measurements may be discarded in favor of new ones. This moving window has the effect of potentially changing the metric scale over time, but more importantly it may allow the system to be robust to measurement error and avoid pathological initializations.

Conclusion

An autonomous MAV system may be implemented that navigates forest trails under the canopy using deep neural networks (DNNs). A TrailNet DNN may utilize shifted ReLU activation functions for increased accuracy and computational efficiency, and may incorporate 3 additional categories via transfer learning to enable the estimation of both lateral offset and view orientation with respect to the trail. The DNN may also implement a loss function to prevent overconfidence in the network. Together, these improvements may yield smoother and more robust navigation control. Environmental awareness may also be generated with additional perceptual modules, including DNN-based object detection and obstacle detection via monocular visual odometry. All software may run simultaneously in real time on an on-board computing device within the MAV. Together, these improvements may enable fully autonomous, safe robotic navigation in unstructured environments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

classifying, using one or more neural networks, a plurality of images to indicate a plurality of orientations of a vehicle in an environment with respect to a path;

generating, using the one or more neural networks, a plurality of probabilities that correspond to the plurality of orientations; and causing the vehicle to perform one or more operations based, at least in part, on an orientation with highest probability of the plurality of probabilities.

2. The method of claim 1, further comprising: using the orientation with highest probability to identify a location of the vehicle.

3. The method of claim 2, further comprising: positioning the vehicle to the location based, at least in part, on steering directions received from a controller, wherein the controller converts the orientation with highest probability to steering directions.

4. The method of claim 1, further comprising: computing a turn angle for the vehicle based, at least in part, on the plurality of probabilities.

5. The method of claim 4, wherein the plurality of images, captured by one or more imaging devices, comprise information that indicates a size of an object in the plurality of images.

6. The method of claim 5, further comprising: comparing the size of the object in the plurality of images with a predetermined threshold; and generating, by a controller, one or more commands to control the vehicle based, at least in part, on the comparison.

7. The method of claim 1, wherein the vehicle is an autonomous aerial vehicle.

8. The method of claim 1, wherein the one or more neural networks comprise a deep neural network (DNN).

9. A system, comprising:

one or more processors to:

classify, using one or more neural networks, a plurality of images to indicate a plurality of orientations of a vehicle in an environment with respect to a path;

generate, using the one or more neural networks, a plurality of probabilities that correspond to the plurality of orientations; and cause the vehicle to perform one or more operations based, at least in part, on an orientation with highest probability of the plurality of probabilities.

10. The system of claim 9, wherein the one or more processors are further to use data from a previously trained neural network, via transfer learning, to train the one or more neural networks.

11. The system of claim 10, wherein the one or more processors are further to:

receive image data from one or more imaging devices; and train the one or more neural networks by using the image data and the data from the previously trained neural network.

12. The system of claim 11, wherein the image data comprises data labeled with a position.

13. The system of claim 9, wherein the path comprises at least one of: a trail, one or more train tracks, one or more tire tracks, one or more power lines, a street, a culvert, and an urban canyon.

14. One or more processors, comprising:

circuitry to:

classify, using one or more neural networks, a plurality of images to indicate a plurality of orientations of a vehicle in an environment with respect to a path;

generate, using the one or more neural networks, a plurality of probabilities that correspond to the plurality of orientations; and cause the vehicle to perform one or more operations based, at least in part, on an orientation with highest probability of the plurality of probabilities.

15. The one or more processors of claim 14, wherein the circuitry is further to obtain a command to re-position the vehicle to a location based on the orientation with highest probability.

16. The one or more processors of claim 15, wherein the circuitry is further to:

receive the plurality of images from one or more imaging devices that utilizes a robotic operating system; and use information from the plurality of images to generate the plurality of probabilities.

17. The one or more processors of claim 14, wherein the plurality of orientations of the vehicle comprises a position of the vehicle with respect to a centerline of the path.

18. The one or more processors of claim 14, wherein the circuitry is further to:

cause a controller to generate steering instructions based, at least in part, on the plurality of probabilities; and send the steering instructions to the vehicle.

19. The one or more processors of claim 18, wherein the circuitry is further to:

convert, at the vehicle, the steering instructions to a vehicle control protocol executable by the vehicle.

20. The one or more processors of claim 14, wherein the circuitry is to determine a turn angle based, at least in part, on the plurality of probabilities.

* * * * *